Sept. 5, 1939.  W. A. RIDDELL  2,172,295

SETTING SHUTTER LEAF REBOUND LATCH

Filed March 4, 1938

William A. Riddell
INVENTOR
BY
ATTORNEYS

Patented Sept. 5, 1939

2,172,295

UNITED STATES PATENT OFFICE 2,172,295

SETTING SHUTTER LEAF REBOUND LATCH

William A. Riddell, Rochester, N. Y., assignor to Eastman Kodak Company, Rochester, N. Y., a corporation of New Jersey Application March 4, 1938, Serial No. 193,889

8 Claims. (Cl. 95—63)

This invention relates to photography and more particularly to photographic shutters.

One object of my invention is to provide a shutter with a mechanism for normally latching the shutter blades in a closed position, this latch being releasable by setting the shutter. Another object of my invention is to provide a shutter master member which must be manually set and to provide connections between a shutter blade ring latch and the setting member by which the blade ring latch will be rendered inoperative only when the master member has been set. Still another object of my invention is to provide a shutter of the setting type in which the blade ring is rocked back and forth by one latch connected to the master member and is held in a latched position by a second latch carried by the shutter. A still further object of my invention is to provide a shutter in which any possible rebound by the master member cannot be transmitted to the shutter leaves and in which rebound by the master member will not permit the shutter blade ring to also rebound, thus making a partial double exposure. Other objects will appear from the following specification, the novel features being particularly pointed out in the claims at the end thereof.

In photographic shutters which are susceptible of producing high speeds, particularly exposures from $\frac{1}{200}$ to $\frac{1}{500}$ of a second, the master member has to travel at high speed and it is very difficult to occasionally prevent a certain amount of rebound in the master member which occurs when it suddenly comes to rest after having made an exposure. Shutters of this type require that the shutter master member be manually set before an exposure can be made because with the automatic type of shutters, it is impossible to move the parts at a sufficiently high speed.

With shutters of the type described, it sometimes occurs that a considerable amount of rebound by the shutter member may allow the leaves to partially open again, thus occasionally spoiling the exposure.

My present invention is particularly directed to preventing the rebound of the master member from allowing a rebound of the blade operating ring. The blade operating ring, of course, must move exceedingly rapidly, and with the type of shutter which will next be described, the blade operating ring moves back and forth as the master member moves from a tensioned position to an untensioned position so as to rock a latch which connects the master member to the blade ring back and forth for an exposure. With this type of shutter, the latch moves idly without operating the blade ring as the shutter is tensioned.

Coming now to the drawing wherein like reference characters denote like parts throughout:

Figure 1:
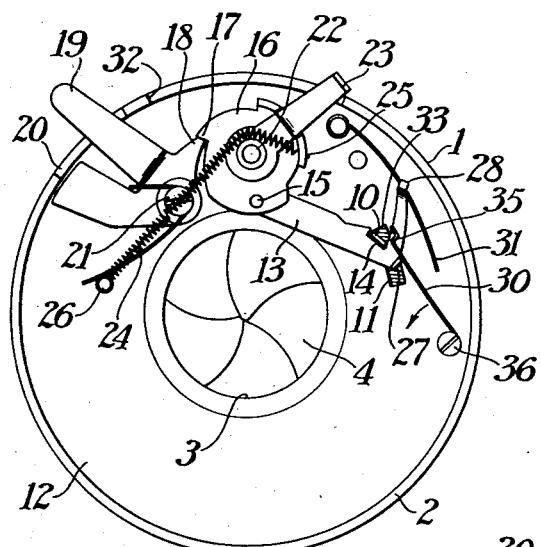
Fig. 1 is a plan view of a typical shutter constructed in accordance with and embodying a preferred form of my invention. In this view the shutter cover is removed and all of the mechanism which is not pertinent to this invention is omitted.
Figure 3:
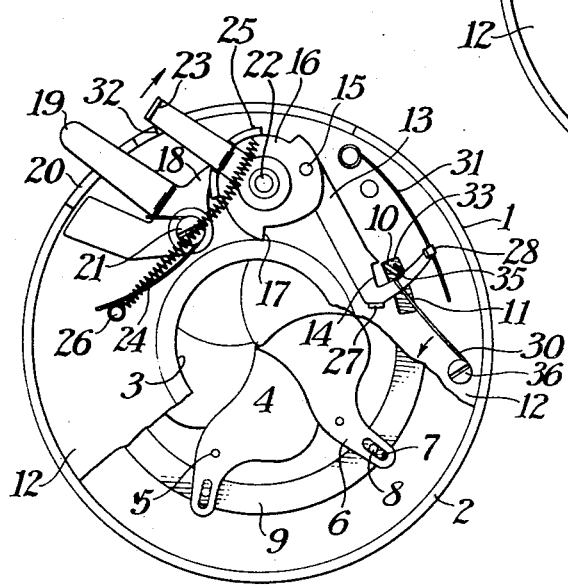
Fig. 3 is a view similar to the preceding figures with the parts in their normal position of rest.

As indicated in Fig. 1, the shutter may comprise a casing member 1 having an upstanding flange 2 extending around the edge and having the usual exposure aperture 3 which is normally covered by a plurality of shutter blades 4 which may be of the shape shown in Fig. 3. Each blade is pivoted at 5 to the shutter casing and has an extension 6 slotted at 7 to receive a pin 8 carried by a blade ring 9.

This blade ring may be oscillated back and forth to cause the shutter leaves 4 to open and close to make an exposure in a known manner by means of an upstanding lug 10 which projects upwardly through a slot 11 in the plate 12 into a position in which it may be engaged by the blade ring operating mechanism.

In the present instance, the lug 10 may be oscillated back and forth by the latch member 13 which is provided with a hook 14 which engages the lug 10 when the parts are in the proper position. The latch member 13 is pivotally attached at 15 to the master member 16, this member including a hook 17 which may be engaged by an arm 18 carried by the trigger 19 which projects through an opening 20 in the shutter casing. The trigger is pivotally attached at 21 to the plate 12 and the master member is pivotally mounted on a stud 22 also carried by the plate 12.

Figure 4:
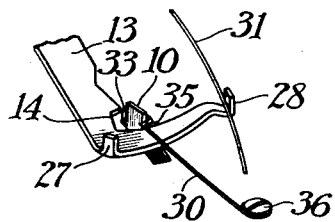
Fig. 4 is a fragmentary detail perspective view of the two latch elements and their relation to the blade ring lug.

The master member is provided with a manual setting lever 23 by which the master member 16 may be moved from the position shown in Fig. 3 to the position shown in Fig. 1 in order to tension the spring 24 which is connected to the master member at 25 and to the plate 12 by means of a pin 26. The master member latch 13 is provided, as best shown in Fig. 4, with a hook 14 which may engage the blade ring lug 10 and with two arms 27 and 28. The former is for releasing the spring latch 30 as will be hereafter more fully described, and the latter is to normally swing the latch member 13 into engagement with the lug 10. As will be seen from Figs. 1 and 4, the upstanding arm 28 of the latch 13 engages a light spring 31.

Figure 2:
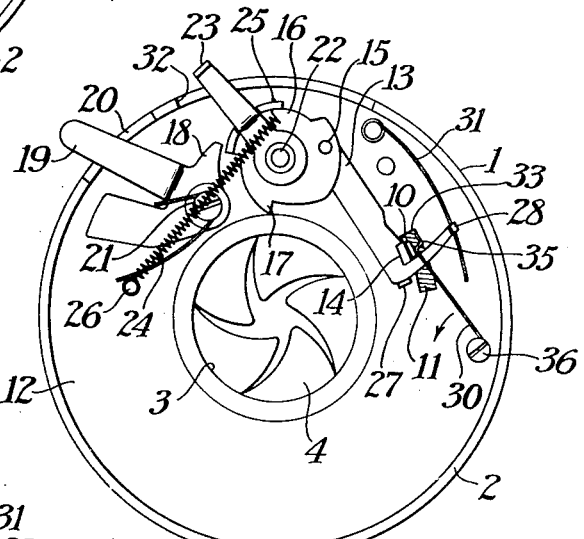
Fig. 2 is a view similar to Fig. 1, but showing the master member and associated parts in a position which they might assume after a fast exposure has been made.

With shutters constructed as above described, it sometimes occurs when the shutter is operating at high speeds that the master member 16, in coming to a stop by striking the casing edge 32, as shown in Fig. 3, causes a slight rebound upon its pivot 22 so that the master member and latch 13 may move to the position shown in Fig. 2. When in this position, it will be seen that the hook 14 is not in engagement with both sides of the lug 10, and consequently, the blade ring 9 may also tend to rebound when lug 10 strikes the stop comprising the end 33 of the slot 11 in plate 12 through which it operates. It is therefore possible for the blades to spring open, sometimes as far as is shown in Fig. 2, if it were not for the spring latch 30, which will now be described. The spring latch 30 is provided with a hook end 35 and the opposite end is attached to a stud 36. The spring latch 30, through the spring in the wire of which the latch is made, tends to turn the latch in the direction shown by the arrow so that it will normally engage the blade ring lug 10 and hold it in the position shown in Fig. 3. This is the normal position of rest.

When the shutter is to be set, the setting lever 23 is moved in the direction shown by the arrow in Fig. 3, placing the spring 24 under tension and catching the latch members 17 and 18 together as shown in Fig. 1. During the setting movement, the upstanding arm 27 on the latch 13 will engage a portion of the spring wire 30 moving the bent end 35 out of engagement with the blade ring lug 10, as indicated in Fig. 1. Thus, when the shutter is set and is in position for an exposure to be made, the latch 30 is ineffective.

By depressing the trigger 19, the operating latch 13 rapidly oscillates back and forth and carries the upstanding lug 10 with it, opening and closing the shutter. If the exposure should be a very fast exposure, the arm 23 may strike the shoulder 32, travelling at a rather high speed and the master member may rebound. However, as soon as the upstanding arm 27 moves away from the spring latch 30, the spring latch again presses on the lug 10 and will engage it in the bent end 35 just as soon as the blade ring lug reaches the position shown in Fig. 3. Thus, even if the master member should rebound from this position, moving the arm 28 away from the lug 10, the lug 10 still cannot rebound at the same time by striking the stop 33 because of the spring latch 30.

As above described, I have provided a shutter in which the setting member may travel at a high speed and may rebound without affecting the exposure. Even though the rebound may occur in the master member, it cannot occur in the blade ring because the blade ring is latched separately from the master member so as to hold the blades in a normally closed position. The arrangement of the blade ring latch is such that by setting the shutter and placing the spring of the master member under tension, the latch is manually released at the same time the shutter is set so that the blade ring will be in position for exposure.

What I claim is:

1. In a shutter, the combination with a casing, of mechanism therein comprising shutter blades, a blade ring, a lug on the blade ring for oscillating it to open and close the blades, a pivoted master member, a setting lever projecting from the casing for manually tensioning the master member, a trigger projecting from the casing for releasing the master member, a pair of latches, one connected to the master member and adapted to engage the lug for opening and closing the blades, the other connected to the shutter for normally holding the shutter blades closed, and means for releasing the second latch actuated by setting the shutter.

2. In a shutter, the combination with a casing, of mechanism therein comprising shutter blades, a blade ring, a lug on the blade ring for oscillating it to open and close the blades, a pivoted master member, a setting lever projecting from the casing for manually tensioning the master member, a trigger projecting from the casing for releasing the master member, a pair of latches, one connected to the master member and adapted to engage the lug for opening and closing the blades, the other connected to the shutter for normally holding the shutter blades closed, and means carried by the first latch for releasing the second as the former is moved in setting the shutter.

3. In a photographic shutter, the combination with shutter blades, of a blade ring, a lug carried thereby for moving the blades, a pivoted master member including a spring, a lever for setting the master member placing said spring under tension, stops for limiting the movement of the master member, a latch carried by the master member adapted to engage the lug for opening and closing the shutter blades, and a second spring latch member positioned to engage the lug in the normal position of rest when the blades are closed to prevent possible rebound of the master member from partially reopening the shutter blades by striking said stop.

4. In a photographic shutter, the combination with shutter blades, of a blade ring, a lug carried thereby for moving the blades, a pivoted master member including a spring, a lever for setting the master member placing said spring under tension, stops for limiting the movement of the master member, a latch carried by the master member adapted to engage the lug for opening and closing the shutter leaves, a second latch carried by the shutter comprising a light spring wire bent to form a shoulder to engage the blade operating lug and normally tending to turn thereagainst, each of said latches being adapted to engage said lug when said master members rest against a stop.

5. In a photographic shutter, the combinatiton with shutter blades, of a blade ring, a lug carried thereby for moving the blades, a pivoted master member including a spring, a lever for setting the master member placing said spring under tension, stops for limiting the movement of the master member, a latch carried by the master member adapted to engage the lug for opening and closing the shutter leaves, a light spring latch for engaging the lug and means carried by the first latch for releasing the second latch as the master member is set toward one stop, said spring latch being adapted to engage the lug when said master member moves against the other stop.

6. In a photographic shutter, the combination with shutter blades, of a blade ring, a lug carried thereby for moving the blades, a pivoted master member including a spring, a lever for setting the master member placing said spring under tension, stops for limiting the movement of the master member, a latch carried by the master member adapted to engage the lug for opening and closing the shutter leaves, as the master member oscillates upon its pivot, a pivot for connecting the latch to the master member, said pivot being positioned to swing the latch and with it the lug back and forth for making an exposure when the master member moves to a normal position of rest, and to swing the latch idly past the lug when the shutter is set, a second spring latch for holding the lug in a position to hold the shutter blades closed, and means carried by the first latch and adapted to engage the second latch for releasing the latter during the setting movement in which the first latch moves without moving the lug.

7. In a photographic shutter, the combination with shutter blades, of a blade ring, a lug carried thereby for moving the blades, a pivoted master member including a spring, a lever for setting the master member placing said spring under tension, stops for limiting the movement of the master member, a latch carried by the master member adapted to engage the lug for opening and closing the shutter leaves, as the master member oscillates upon its pivot, a pivot for connecting the latch to the master member, said pivot being positioned to swing the latch and with it the lug back and forth for making an exposure when the master member moves to a normal position of rest, and to swing the latch idly past the lug when the shutter is set, a second spring latch for holding the lug in a position to hold the shutter blades closed, and a protuberance carried by one edge of the first latch in position to engage the second latch during the idle stroke of the former in setting the shutter whereby the second latch is released when the master member is set.

8. In a shutter, the combination with a casing, of mechanism therein comprising shutter blades, a blade ring and a lug on the blade ring for oscillating it to open and close the blades, a master member, a lever means for manually setting the master member, a stop defining one position of the master member, means carried by the master member for latching the lug temporarily to move with the master member and for releasing the lug, a spring latch for normally engaging the lug, means carried by the master member latch for releasing the spring latch when the master member is set, the master member lug latch being driven to a position to release the lug by actuating the shutter trigger before the master member reaches its stop whereby said spring latch may be free to engage said lug and prevent rebound which may otherwise occur when said master member strikes said stop.

WILLIAM A. RIDDELL.